(12) United States Patent
Yang et al.

(10) Patent No.: US 12,152,959 B2
(45) Date of Patent: Nov. 26, 2024

(54) CRANKSHAFT SIMULATION DEVICE, DETECTION EQUIPMENT AND METHOD

(71) Applicant: Danfoss (Tianjin) Ltd., Tianjin (CN)

(72) Inventors: Zhuangzhi Yang, Wuqing (CN); Jie Lin, Tianjin (CN); Zhi Li, Tianjin (CN)

(73) Assignee: DANFOSS (TIANJIN) LTD., Tianjin (CN)

( * ) Notice: Subject to any disclaimer, the term of this patent is extended or adjusted under 35 U.S.C. 154(b) by 433 days.

(21) Appl. No.: 17/726,108

(22) Filed: Apr. 21, 2022

(65) Prior Publication Data

US 2022/0341816 A1 Oct. 27, 2022

(30) Foreign Application Priority Data

Apr. 25, 2021 (CN) .......................... 202110446809.7

(51) Int. Cl.
  *G01M 13/02* (2019.01)
  *F16C 3/28* (2006.01)
(52) U.S. Cl.
  CPC .............. *G01M 13/02* (2013.01); *F16C 3/28* (2013.01)
(58) Field of Classification Search
  CPC ...... G01M 13/02; G01M 13/00; G01B 21/24; F16C 3/28; F16C 2360/42; F04C 18/02
  See application file for complete search history.

(56) References Cited

U.S. PATENT DOCUMENTS

| | | | | |
|---|---|---|---|---|
| 2012/0224180 A1* | 9/2012 | Keller | .................. | G01M 11/081 356/445 |
| 2018/0172436 A1* | 6/2018 | Isei | ........................ | G01B 5/003 |

FOREIGN PATENT DOCUMENTS

| | | | |
|---|---|---|---|
| CN | 201991728 U | 9/2011 | |
| CN | 102303258 A | 1/2012 | |
| CN | 203230586 U | 10/2013 | |
| CN | 103512478 A | 1/2014 | |
| CN | 104047850 A | 9/2014 | |
| CN | 104832402 B | * 10/2017 | |

(Continued)

*Primary Examiner* — Francis C Gray
(74) *Attorney, Agent, or Firm* — McCormick, Paulding & Huber PLLC (57) ABSTRACT

A crankshaft simulation device includes: a fixed shaft in which a through hole extending in the axial direction of the fixed shaft is provided; a wedge-shaped rod which is movable in the through hole under an external force, and the first end of the wedge-shaped rod is extendable from the first axial end of the fixed shaft, the second end of the wedge-shaped rod is extendable from the second axial end of the fixed shaft, and the first end of the wedge-shaped rod is provided with an inclined surface so that the first end of the wedge-shaped rod is wedge-shaped; a support rod extending from the first axial end of the fixed shaft in the axial direction of the fixed shaft; a movable shaft in which a flat through hole is provided, and the support rod is inserted into the flat through hole, and the size of the flat through hole in the radial direction of the movable shaft is configured to allow the movable shaft to be shifted in the radial direction of the movable shaft, and the flat through hole is configured to allow the first end of the wedge-shaped rod to be inserted into the flat through hole before the movable shaft is shifted in the radial direction of the movable shaft; and a spring pushing the movable shaft outwards in the radial direction of the movable shaft.

17 Claims, 5 Drawing Sheets

(56) References Cited

FOREIGN PATENT DOCUMENTS

| | | | | |
|---|---|---|---|---|
| CN | 107515107 | A * | 12/2017 | ............ G01M 13/00 |
| CN | 104913934 | B * | 3/2018 | |
| CN | 207673544 | U | 7/2018 | |
| CN | 210893188 | U * | 6/2020 | |
| CN | 212242277 | U | 12/2020 | |
| DE | 10 2007 028 615 | A1 | 1/2008 | |
| JP | H07-279869 | A | 10/1995 | |
| KR | 10-0590490 | B1 | 6/2006 | |

* cited by examiner

CRANKSHAFT SIMULATION DEVICE, DETECTION EQUIPMENT AND METHOD

CROSS-REFERENCE TO RELATED APPLICATION

This application claims foreign priority benefits under U.S.C. § 119 to Chinese Patent Application No. 202110446809.7 filed on Apr. 25, 2021, the content of which is hereby incorporated by reference in its entirety.

TECHNICAL FIELD

The present disclosure relates to a crankshaft simulation device, which is adapted to simulate the movement of a crankshaft in a scroll compressor. The present disclosure also relates to a detection equipment adopting such a crankshaft simulation device and a method for detecting the eccentric movement trajectory of a moving component by using the detection equipment.

BACKGROUND

Eccentric movement of a moving component is widely used in machinery and industrial products to provide ideal movement trajectory or to provide higher air or oil pressure by continuous compression. Taking a scroll compressor as an example, it can provide a more stable air pressure output more efficiently.

When it is necessary to manually detect the eccentric movement trajectory of the moving component, there is often no suitable crankshaft that can be easily extended into the moving component to transmit power, or it is inconvenient to be positioned with the moving component, or it cannot be inserted into the moving component when the assembly of the tooling and the moving component is finished. Specifically, before manually simulating the eccentric movement of the moving component, the moving component needs to be placed in the tooling. However, due to the limited space of the tooling, it is difficult to extend the crankshaft for providing power into the moving component through the tooling. It results in a great obstruction to the detection work.

Therefore, it is desired to design a retractable crankshaft, which can be easily inserted into the moving component and switched to a working mode so that the manual detection of the eccentric movement of the moving component can be easily realized.

SUMMARY

Technical Problem to be Solved

The present disclosure is made in order to solve the above-mentioned problem and other potential technical problems.

Technical Solution

According to one aspect of the present disclosure, there is provided a crankshaft simulation device. The crankshaft simulation device comprises:

a generally cylindrical fixed shaft configured to have a first axial end and a second axial end, and a through hole extending in the axial direction of the fixed shaft and running through the fixed shaft is provided in the fixed shaft;

a wedge-shaped rod inserted into the through hole, which is movable in the axial direction of the fixed shaft under an external force, and the first end of the wedge-shaped rod is extendable from the first axial end of the fixed shaft, the second end of the wedge-shaped rod is extendable from the second axial end of the fixed shaft, and the first end of the wedge-shaped rod is provided with an inclined surface so that the first end of the wedge-shaped rod is wedge-shaped;

a support rod extending from the first axial end of the fixed shaft in the axial direction of the fixed shaft, the first end of the support rod is a free end and the second end of the support rod is fixed to the first axial end of the fixed shaft;

a generally cylindrical movable shaft in which a flat through hole is provided, and the flat through hole is configured to extend in the axial direction of the movable shaft and run through the movable shaft, the support rod is inserted into the flat through hole so that the movable shaft is sleeved on the support rod, and the size of the flat through hole in the radial direction of the movable shaft is configured to allow the movable shaft to be shifted in the radial direction of the movable shaft, and the flat through hole is configured to allow the first end of the wedge-shaped rod to be inserted into the flat through hole before the movable shaft is shifted in the radial direction of the movable shaft; and a spring, one end of which abutting on the support rod and the other end of which abutting on the inner wall of the flat through hole of the movable shaft, so as to push the movable shaft outwards in the radial direction of the movable shaft.

In non-working state of the crankshaft simulation device, the first end of the wedge-shaped rod is inserted into the flat through hole and the movable shaft is non-shiftable in the radial direction of the movable shaft due to the movable shaft being blocked by the first end of the wedge-shaped rod, resulting in the central axis of the movable shaft being substantially aligned with the central axis of the fixed shaft, so that the crankshaft simulation device is generally in the form of a straight shaft. In the working state of the crankshaft simulation device, the first end of the wedge-shaped rod is moved out of the flat through hole and is retracted into the through hole, and the movable shaft is shifted outwards in the radial direction of the movable shaft under the elastic force of the spring, resulting in the central axis of the movable shaft being deviated from the central axis of the fixed shaft, so that the crankshaft simulation device is generally in the form of a crankshaft and the movable shaft is drivable by the fixed shaft to rotate eccentrically.

Preferably, a protrusion is provided on the end face of the first axial end of the fixed shaft, and a groove is provided on the end face of the movable shaft opposite to the first axial end of the fixed shaft, the groove is configured to extend in the shifting direction of the movable shaft, and the protrusion is embedded in the groove. The protrusion is slidable in the groove when the movable shaft is shifted in the radial direction of the movable shaft. A circumferential force is applicable by the protrusion to the side wall of the groove when the fixed shaft is rotated around its central axis, thereby driving the movable shaft to rotate eccentrically.

The support rod and the fixed shaft may be integrally formed integral members. Alternatively, the support rod may be a separate component relative to the fixed shaft, and the second end of the support rod is inserted and fastened into a hole of the first axial end of the fixed shaft.

Specifically, when the second end of the wedge-shaped rod is pulled by an external force, the wedge-shaped rod is moved away from the movable shaft in the axial direction of the fixed shaft, so that the first end of the wedge-shaped rod is moved out of the flat through hole and retracted into the through hole. When the second end of the wedge-shaped rod is pushed by an external force, the wedge-shaped rod is moved towards the movable shaft in the axial direction of the fixed shaft, and the first end of the wedge-shaped rod is extended out of the through hole and gradually inserted into the flat through hole of the movable shaft, so that the movable shaft is returned to an unshifted state due to being pressed by the inclined surface of the first end of the wedge-shaped rod.

Optionally, a block is provided at the first end of the support rod to prevent the movable shaft from falling off the support rod.

Optionally, the diameters of the two ends of the wedge-shaped rod are larger than the diameter of the middle section of the wedge-shaped rod, and the diameter of the middle section of the through hole is smaller than the diameter of the two ends of the wedge-shaped rod, so as to prevent the wedge-shaped rod from falling off the through hole.

According to another aspect of the present disclosure, there is provided a detection equipment adapted to detect the eccentric movement trajectory of a moving component. The detection equipment comprises: a crankshaft simulation device according to the previous aspect; and a tooling on which tooling holes are provided, and a moving component to be detected is pre-arranged in the tooling. In non-working state of the crankshaft simulation device, the movable shaft and a part of the fixed shaft are insertable into the tooling holes, resulting in the movable shaft being inserted into the moving component to be detected, so that the moving component to be detected is driven by the movable shaft to perform eccentric movement in the working state of the crankshaft simulation device.

According to another aspect of the present disclosure, there is provided a method for detecting an eccentric movement trajectory of a moving component by using the detection equipment described in the previous aspect. The method comprises:

arranging the moving component to be detected in the tooling;

in non-working state of the crankshaft simulation device, inserting the movable shaft and a part of the fixed shaft into the tooling holes so that the movable shaft is inserted into the moving component to be detected;

pulling the second end of the wedge-shaped rod with an external force to move the wedge-shaped rod away from the movable shaft in the axial direction of the fixed shaft, and have the first end of the wedge-shaped rod moved out of the flat through hole and retracted into the through hole, the movable shaft is shifted outwards in the radial direction of the movable shaft under the elastic force of the spring, resulting in that the central axis of the movable shaft is deviated from the central axis of the fixed shaft, thereby causing the crankshaft simulation device to be switched into working state; and driving the fixed shaft to rotate around its central axis with an external force, the movable shaft is driven by the fixed shaft to perform eccentric rotation, and the moving component to be detected is driven by the movable shaft to perform eccentric movement.

The above-mentioned method may further comprise: pushing the second end of the wedge-shaped rod with an external force after the eccentric movement trajectory of the moving component has been detected to move the wedge-shaped rod towards the movable shaft in the axial direction of the fixed shaft, and have the first end of the wedge-shaped rod extended out of the through hole and gradually inserted into the flat through hole of the movable shaft, so that the movable shaft is returned to an unshifted state due to being pressed by the inclined surface of the first end of the wedge-shaped rod; and removing the crankshaft simulation device from the tooling holes.

In the above-mentioned method, the external force may be applied by the hand of an operator of the detection equipment.

Technical Effect

For a component that is driven by the drive shaft and move eccentrically in the tooling, the crankshaft simulation device provided by the present disclosure can be used as a drive connecting shaft to facilitate insertion and removal in the tooling, and to switch between working and non-working states. Also, the crankshaft simulation device provided by the present disclosure has a simple structure, good practical effect, and is suitable for engineering applications.

BRIEF DESCRIPTION OF THE DRAWINGS

In order to facilitate understanding of the present disclosure, the present disclosure is hereinafter described in more detail based on exemplary embodiments and in conjunction with the accompanying drawings. The same or similar reference numbers are used in the accompanying drawings to refer to the same or similar components. It should be understood that the accompanying drawings are schematic only and that the dimensions and proportions of components in the accompanying drawings are not necessarily precise.

DETAILED DESCRIPTION

Hereinafter, the present disclosure is described in detail with reference to the accompanying drawings.

Figure 1A:
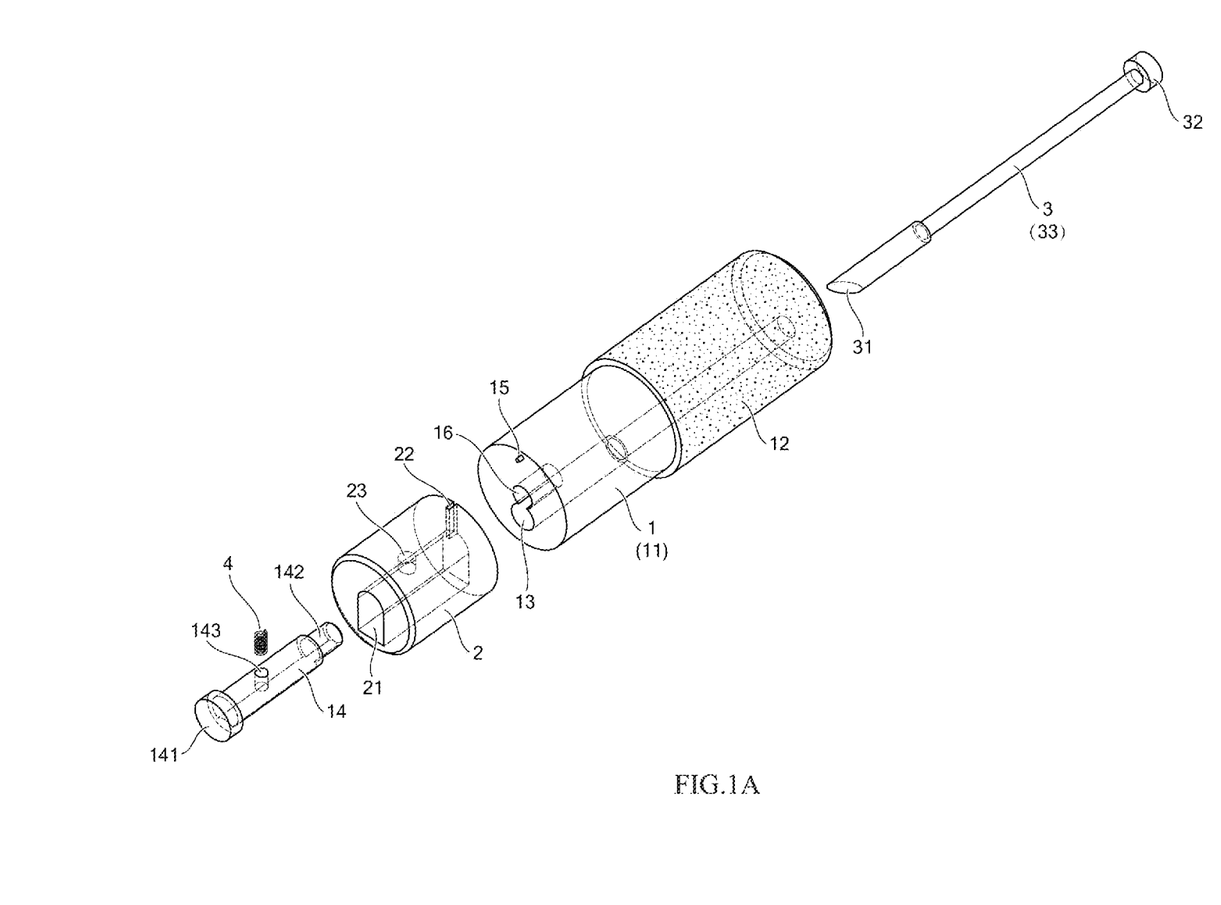
FIGS. 1A and 1B are partially exploded perspective views of a crankshaft simulation device according to an exemplary embodiment of the present disclosure.
Figure 1B:
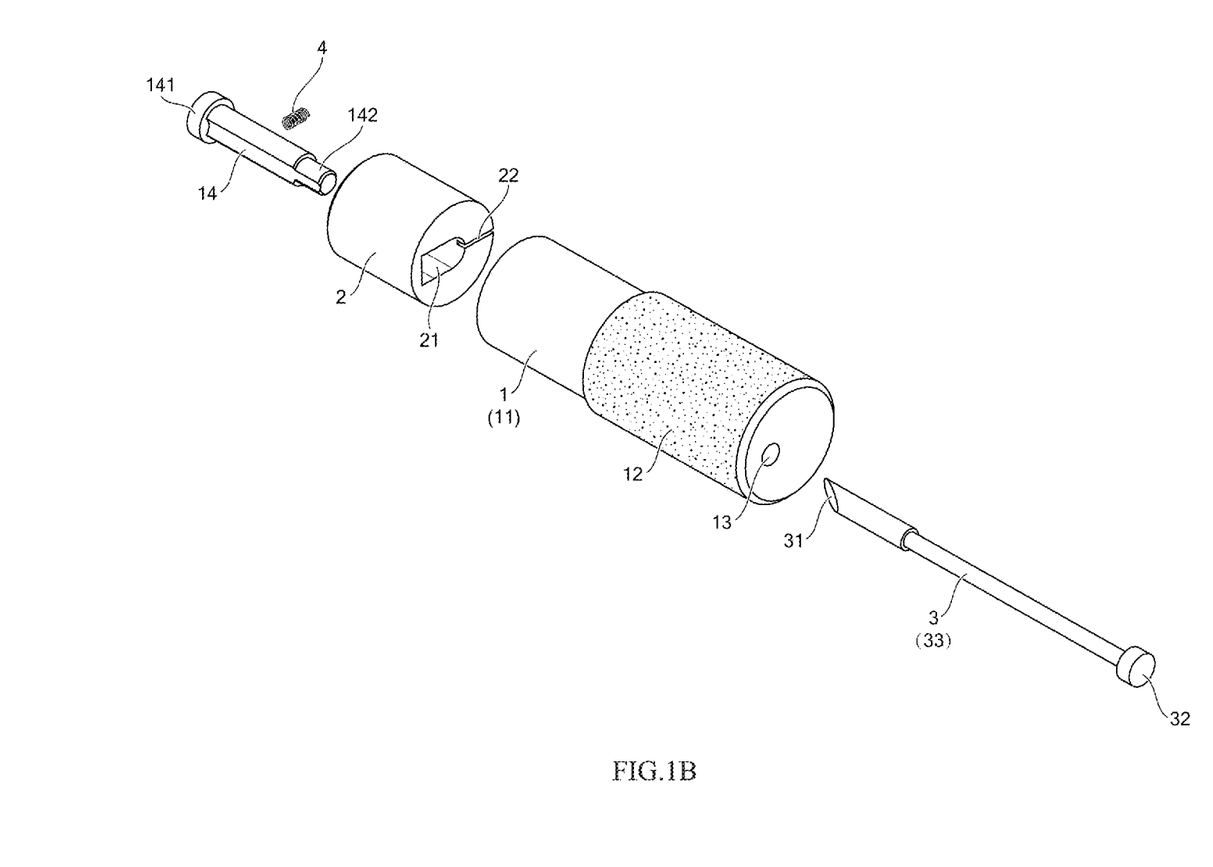

FIGS. 1A and 1B are partially exploded perspective views of a crankshaft simulation device according to an exemplary embodiment of the present disclosure.

As shown in FIGS. 1A and 1B, a crankshaft simulation device mainly comprises a fixed shaft 1, a support rod 14, a movable shaft 2, a wedge-shaped rod 3, and a spring 4.

Specifically, the fixed shaft 1 is configured to have a main body 11, which is generally cylindrical and has a first axial end and a second axial end. Optionally, a gripping area 12 with larger friction force is provided on the outer circumference of the second axial end of the fixed shaft 1, so that it is convenient for an operator of the crankshaft simulation device to hold and apply external force by hand. A through hole 13 is provided in the fixed shaft 1. The through hole 13 is configured to extend in the axial direction of the fixed shaft 1 and run through the fixed shaft 1.

The support rod 14 is configured to extend from the first axial end of the fixed shaft 1 in the axial direction of the fixed shaft. The first end of the support rod 14 is a free end, and the second end 142 of the support rod is fixed to the first axial end of the fixed shaft 1. In the embodiment shown in FIGS. 1A and 1B, the support rod 14 is a separate component with respect to the fixed shaft 1, and the second end 142 of the support rod 14 is inserted and fastened into a hole 16 of the first axial end of the fixed shaft 1. In addition, although not explicitly shown in the drawings, those skilled in the art can imagine that the support rod 14 can be fastened to the first axial end of the fixed shaft 1 by welding, screw fitting or spline fitting, etc. Optionally, the support rod 14 and the fixed shaft 1 are integrally formed integral members. Preferably, the central axis of the support rod 14 is collinear with the central axis OO' of the fixed shaft 1.

The wedge rod 3 is inserted in the through hole 13 in advance. The wedge rod 3 can move in the axial direction of the fixed shaft 1 under an external force. The first end of the wedge-shaped rod 3 can extend out of the first axial end of the fixed shaft 1, and the second end of the wedge-shaped rod 3 can extend out of the second axial end of the fixed shaft 1. An inclined surface 31 is provided on the first end of the wedge-shaped rod 3 so that the first end of the wedge-shaped rod 3 is wedge-shaped. Optionally, the diameters of two ends of the wedge-shaped rod 3 are larger than the diameter of the middle section 33 of the wedge-shaped rod, and correspondingly, the diameter of the middle section of the through hole 13 is smaller than the diameter of the two ends of the wedge-shaped rod 3 to prevent the wedge-shaped rod 3 from falling out of the through hole 13. Specifically, a block 32 is provided at the second end of the wedge-shaped rod 3. In addition to preventing the wedge rod 3 from falling out of the through hole 13, the block 32 also facilitates the operator of the crankshaft simulation device to manually apply an external force (pulling force or pushing force) to the wedge rod 3.

The movable shaft 2 is configured to have a cylindrical shape as a whole. A flat through hole 21 is provided in the movable shaft 2. The flat through hole 21 is configured to extend in the axial direction of the movable shaft 2 and run through the movable shaft 2. The support rod 14 is inserted into the flat through hole 21 to have the movable shaft 2 sleeved on the support rod 14. Optionally, a block 141 is provided at the first end of the support rod 14 to prevent the movable shaft 2 from falling off the support rod 14. The size of the flat through hole 21 in the radial direction of the movable shaft 2 is configured to allow the movable shaft 2 to be shifted in the radial direction of the movable shaft 2. The flat through hole 21 is configured to allow the first end of the wedge-shaped rod 3 to be inserted into the flat through hole before the movable shaft 2 is shifted in the radial direction of the movable shaft 2.

One end of the spring 4 abuts on the support rod 14, and the other end abuts on the inner wall of the flat through hole 21 of the movable shaft 2, so as to push the movable shaft 2 outwards in the radial direction of the movable shaft 2, that is, the movable shaft 2 is pushed away from the support rod 14 in the radial direction of the movable shaft 2. In order to position the spring 4, a hole 143 for receiving one end of the spring 4 is provided on the outer circumference of the support rod 14, and correspondingly, a hole 23 for receiving the other end of the spring 4 is provided on the inner wall of the flat through hole 21. In addition, process holes for easy installation and fixation of the spring 4 may be provided on the support rod 14 and/or the movable shaft 2. For the sake of brevity, these process holes are not shown in the drawings. Additionally, although only one spring 4 is schematically shown in the drawings, those skilled in the art can imagine that a plurality of springs 4 can be provided according to actual needs.

Optionally, a protrusion 15 is provided on the end face of the first axial end of the fixed shaft 1, and a groove 22 is provided on the end face of the movable shaft 2 opposite to the first axial end of the fixed shaft 1. The groove 22 is configured to extend in the shifting direction of the movable shaft 2, and the protrusion 15 is embedded in the groove 22. The protrusion 15 can slide in the groove 22 when the movable shaft 2 is shifted in the radial direction of the movable shaft 2 (actually, the protrusion 15 does not move, but the groove 22 moves). A circumferential force is applicable by the protrusion 15 to the side wall of the groove 22 when the fixed shaft 1 is rotated around its central axis OO', thereby driving the movable shaft 2 to rotate eccentrically.

Figure 2A:
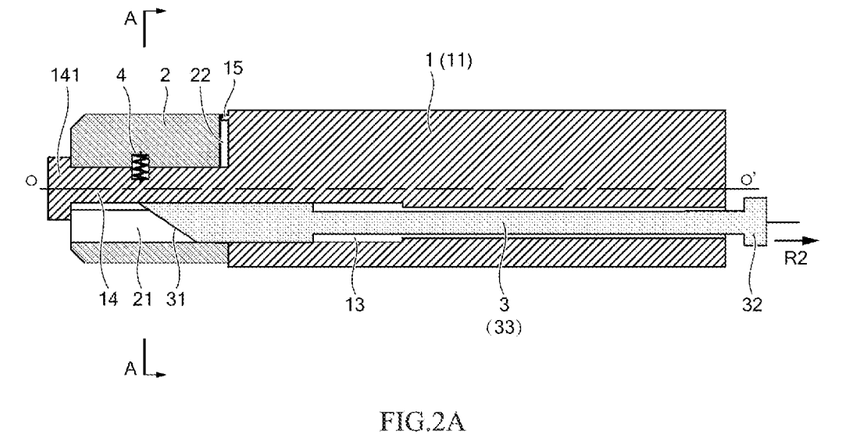
FIGS. 2A and 2B are longitudinal cross-sectional and perspective views of a crankshaft simulation device in non-working state.
Figure 2B:
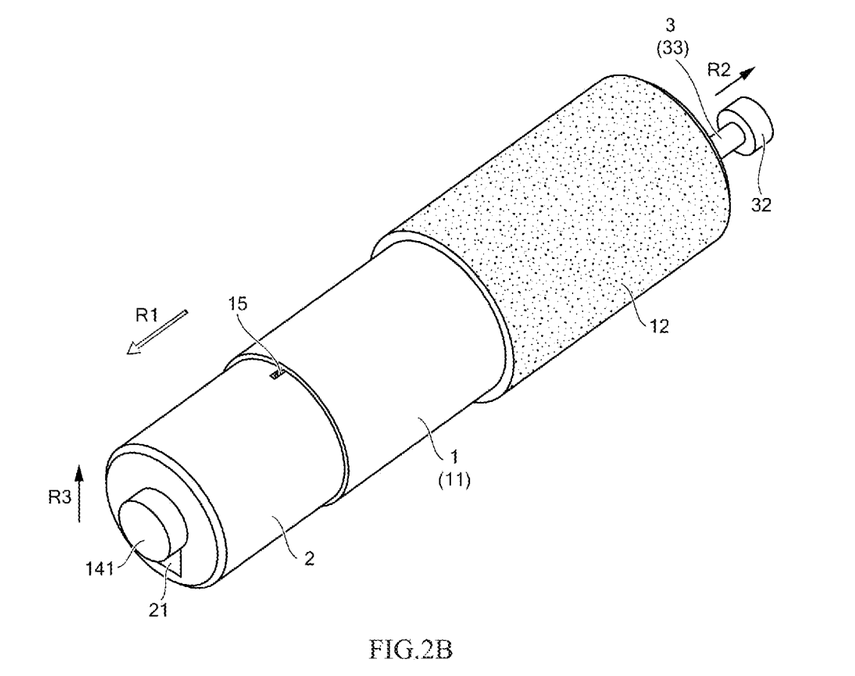
Figure 3A:
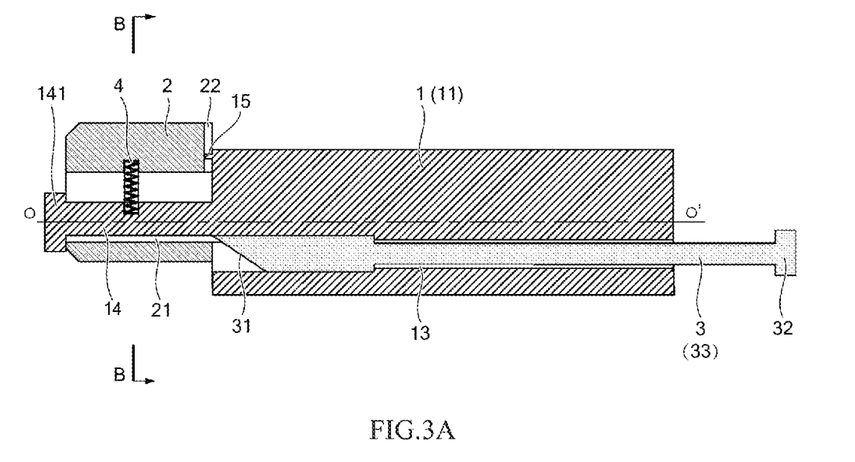
FIGS. 3A and 3B are longitudinal cross-sectional and perspective views of a crankshaft simulation device in working state.
Figure 3B:
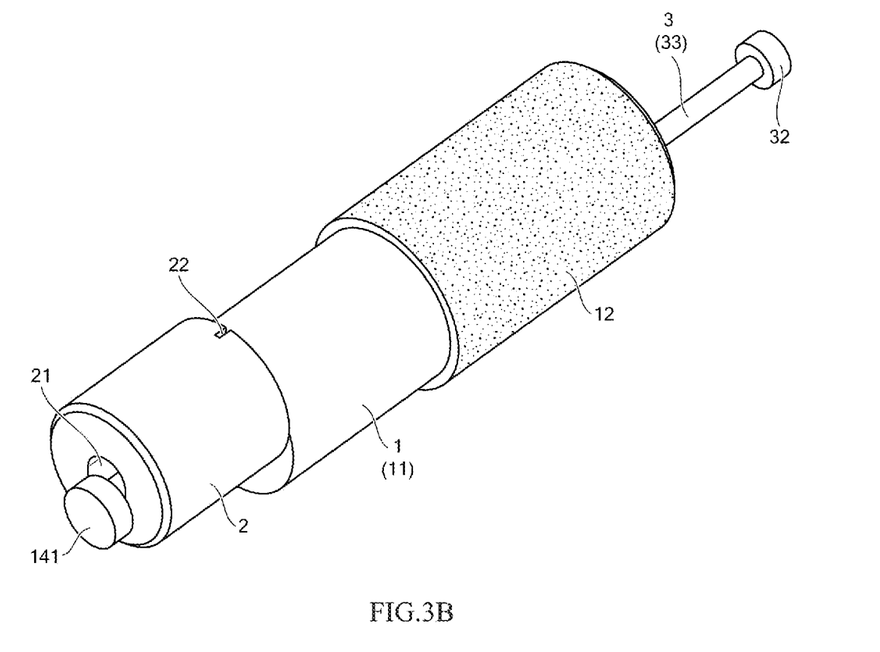

FIGS. 2A and 2B are longitudinal cross-sectional and perspective views of a crankshaft simulation device in non-working state. FIGS. 3A and 3B are longitudinal cross-sectional and perspective views of a crankshaft simulation device in working state.

As shown in FIGS. 2A and 2B, in non-working state of the crankshaft simulation device, the first end of the wedge-shaped rod 3 is inserted into the flat through hole 21 and the movable shaft 2 cannot be shifted in the radial direction of the movable shaft 2 since it is blocked by the first end of the wedge-shaped rod 3, resulting in the central axis of the movable shaft 2 being substantially aligned with the central axis OO' of the fixed shaft, so that the crankshaft simulation device is generally in the form of a straight shaft.

In order to switch the crankshaft simulation device to the working state, the second end of the wedge rod 3 is pulled with an external force to move the wedge-shaped rod 3 away from the movable shaft 2 in the axial direction of the fixed shaft 1 (i.e., move in the direction indicated by the arrow R2). In this way, the first end of the wedge rod 3 is moved out of the flat through hole 21 and retracted into the through hole 13, and the movable shaft 2 is shifted outwards in the radial direction of the movable shaft 2 under the elastic force of the spring 4 (i.e., move in the direction indicated by arrow R3). At this time, the central axis of the movable shaft 2 deviates from the central axis OO' of the fixed shaft 1, so that the crankshaft simulation device is generally in the form of a crankshaft, and the fixed shaft 1 can drive the movable shaft 2 to rotate eccentrically, as shown in FIGS. 3A and 3B.

The present disclosure also provides a detection equipment (not shown), which is adapted to detect the eccentric movement trajectory of the moving component. The detection equipment comprises a crankshaft simulation device and tooling as described above. Tooling holes are provided on the tooling, and a moving component to be detected is pre-arranged in the tooling. In non-working state of the crankshaft simulation device, the movable shaft 2 and a part of the main body 11 of the fixed shaft 1 (e.g., the part not covered by the gripping area 12) can be inserted into the tooling holes, resulting in the movable shaft 2 being inserted into the moving component to be detected, so that the moving component to be detected is driven by the movable shaft 2 to perform eccentric movement in the working state of the crankshaft simulation device.

The present disclosure also provides a method for detecting an eccentric movement trajectory of a moving component by using the detection equipment as described above.

The method comprises:

arranging the moving component to be detected in the tooling;

in the non-working state of the crankshaft simulation device, inserting the movable shaft 2 and a part of the fixed shaft 1 (e.g., the part not covered by the gripping area 12) into the tooling holes in the direction indicated by the arrow R1 in FIG. 2B, so that the movable shaft 2 is inserted into the moving component to be detected;

with the fixed shaft 1 being still, pulling the second end of the wedge-shaped rod 3 with an external force to move the wedge-shaped rod 3 away from the movable shaft 2 in the axial direction of the fixed shaft 1 (i.e., move in the direction indicated by the arrow R2) and have the first end of the wedge-shaped rod 3 moved out of the flat through hole 21 and retracted into the through hole 13, the movable shaft 2 is shifted outwards in the radial direction of the movable shaft 2 under the elastic force of the spring 4 (i.e., move in the direction indicated by the arrow R3), resulting in that the central axis of the movable shaft 2 is deviated from the central axis OO' of the fixed shaft 1, thereby causing the crankshaft simulation device to be switched into working state; and driving the fixed shaft 1 to rotate around its central axis OO' with an external force, the movable shaft 1 is driven by the fixed shaft 2 to perform eccentric rotation, and the moving component 2 to be detected is driven by the movable shaft to perform eccentric movement.

The method may further comprise: pushing the second end of the wedge-shaped rod 3 with an external force after the eccentric movement trajectory of the moving component has been detected to move the wedge-shaped rod 3 towards the movable shaft 2 in the axial direction of the fixed shaft, and have the first end (i.e., the wedge-shaped tip) of the wedge-shaped rod 3 extended out of the through hole 13 and gradually inserted into the flat through hole 21 of the movable shaft 2, so that the movable shaft 2 is returned to an unshifted state due to being pressed by the inclined surface 31 of the first end of the wedge-shaped rod 3; and then, removing the crankshaft simulation device from the tooling holes.

The above-mentioned external forces can be applied by the hand of an operator of the detection equipment, and these external forces comprise a pulling force and a pushing force for moving the wedge-shaped rod 3 and a driving force for rotating the fixed shaft 1 about its central axis OO'.

[Variations]

Variation 1

Although the embodiment in which the support rods 14 is configured to have a cylindrical shape as a whole has been mainly described above, it should be understood that the support rod 14 in variation 1 may be generally in the shape of a prism (e.g., in the shape of a quadrangular prism) as long as the support rod 14 is allowed to be shifted in the flat through hole 21 in the radial direction of the movable shaft 2.

In addition, the flat through hole 21 may be dimensioned to not allow the prismatic support rod 14 to rotate relative to the flat through hole 21 in the flat through hole 21. In this way, the prismatic support rod 14 can function to determine the moving direction of the movable shaft 2 and transmit torque to the movable shaft 2. In this case, the protrusion 15 and the groove 22 as in the previously described embodiment can be cancelled or removed.

Figure 4A:
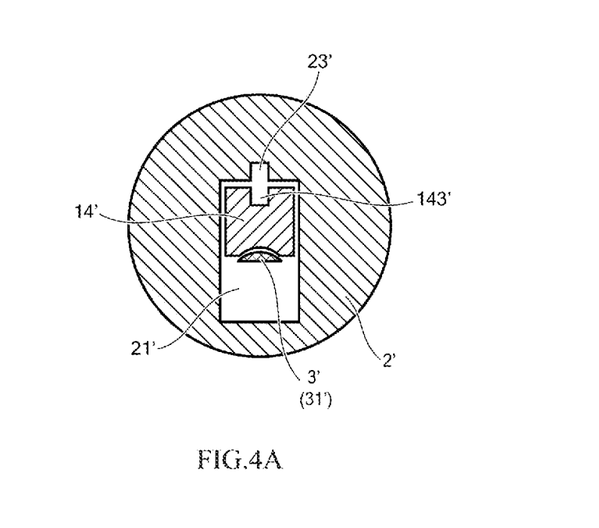
FIGS. 4A and 4B are schematic cross-sectional views of a crankshaft simulation device according to a variant of the present disclosure taken along plane A-A in FIG. 3A and along plane B-B in FIG. 3B, respectively.
Figure 4B:
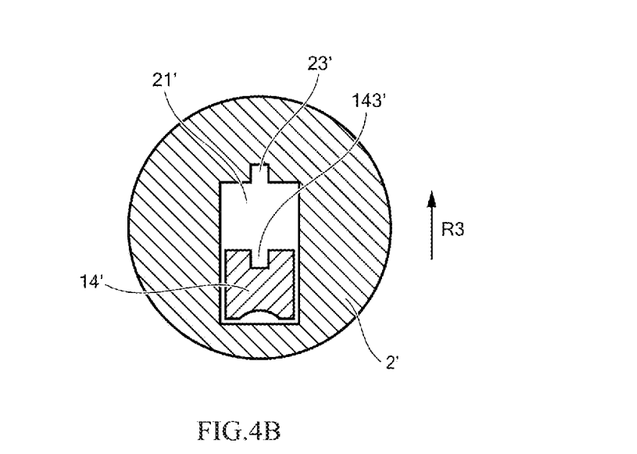

FIGS. 4A and 4B are respectively schematic cross-sectional views of a crankshaft simulation device according to the variant 1 taken along plane A-A in FIG. 3A and along plane B-B in FIG. 3B, and a single quotation mark is added to the upper right corner of the reference numerals of the corresponding components in FIGS. 4A and 4B to differentiate the corresponding components as described above. Additionally, the springs disposed in holes 23' and 143' are not shown in FIGS. 4A and 4B for brevity, but those skilled in the art can imagine the presence of such springs.

Specifically, as shown in FIG. 4A, the wedge-shaped rod 3' starts to move away from the movable shaft 2' in the axial direction of the fixed shaft (i.e., in a direction perpendicular to the inward direction of the drawing in the view of FIG. 4A). As the wedge-shaped rod 3' moves, the movable shaft 2' is gradually no longer pressed by the wedge-shaped rod 3' (inclined surface 31'). Then, under the pushing force of the springs (not shown) provided in the holes 23' and 143', the movable shaft 2' gradually moves away from the support rod 14' in the direction indicated by the arrow R3 (vertically upward in the view of FIG. 4B), and finally have the crankshaft simulation device switched to the working state as shown in FIGS. 3A, 3B and 4B.

In this case, since the support rod 14' is generally in the shape of a quadrangular prism and is configured to have flat left and right side surfaces parallel to each other and the flat through hole 21' is configured to have flat left and right inner surfaces parallel to each other, the sliding fit structure formed by the flat through hole 21' and the support rod 14' can determine the moving direction of the movable shaft 2'. In addition, the flat through hole 21' is dimensioned to not allow the prismatic support rod 14' to rotate relative to the flat through hole 21' in the flat through hole 21', so that the support rod 14' can transmit the torque to the movable shaft 2', thereby driving the movable shaft 2' to rotate. Therefore, in this case, the protrusions 15 and the groove 22 as described in the previous embodiment may or may not be cancelled or removed.

Variation 2

The embodiment in which the protrusion 15 is provided on the fixed shaft 1 and the groove 22 is provided on the movable shaft 2 has been described above. It should be understood that the groove may also be provided on the fixed shaft 1, while the protrusion may be provided on the movable shaft 2 accordingly. In addition, the dimension and number of the protrusions and grooves are not particularly limited.

Variation 3

Though the crankshaft simulation device described above is adapted to simulate the movement of a crankshaft in a scroll compressor, it should be understood that the crankshaft simulation device may be used as a drive shaft for other types of moving components that move eccentrically. In addition, those technical solutions improved and refined on the basis of the present disclosure (for example, adding a lock washer or protective cover, additionally applying adhesive or solder, adding a lubricant or heat sink channel, etc.) are all implicitly disclosed in this article.

Although the technical objects, technical solutions and technical effects of the present disclosure have been described in detail above with reference to specific embodiments, it should be understood that the above-mentioned embodiments are only exemplary rather than restrictive. Within the essential spirit and principles of the present disclosure, any modifications, equivalent replacements, and improvements made by those skilled in the art are included within the protection scope of the present disclosure.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A crankshaft simulation device, comprising:
   a generally cylindrical fixed shaft configured to have a first axial end and a second axial end, and a through hole extending in the axial direction of the fixed shaft and running through the fixed shaft is provided in the fixed shaft;
   a wedge-shaped rod inserted into the through hole, which is movable in the axial direction of the fixed shaft under an external force, and the first end of the wedge-shaped rod is extendable from the first axial end of the fixed shaft, the second end of the wedge-shaped rod is extendable from the second axial end of the fixed shaft, and the first end of the wedge-shaped rod is provided with an inclined surface so that the first end of the wedge-shaped rod is wedge-shaped;
   a support rod extending from the first axial end of the fixed shaft in the axial direction of the fixed shaft, the first end of the support rod is a free end and the second end of the support rod is fixed to the first axial end of the fixed shaft;
   a generally cylindrical movable shaft in which a flat through hole is provided, and the flat through hole is configured to extend in the axial direction of the movable shaft and run through the movable shaft, the support rod is inserted into the flat through hole so that the movable shaft is sleeved on the support rod, and the size of the flat through hole in the radial direction of the movable shaft is configured to allow the movable shaft to be shifted in the radial direction of the movable shaft, and the flat through hole is configured to allow the first end of the wedge-shaped rod to be inserted into the flat through hole before the movable shaft is shifted in the radial direction of the movable shaft; and
   a spring, one end of which abutting on the support rod and the other end of which abutting on the inner wall of the flat through hole of the movable shaft, so as to push the movable shaft outwards in the radial direction of the movable shaft,
   wherein, in non-working state of the crankshaft simulation device, the first end of the wedge-shaped rod is inserted into the flat through hole and the movable shaft is non-shiftable in the radial direction of the movable shaft due to the movable shaft being blocked by the first end of the wedge-shaped rod, resulting in the central axis of the movable shaft being substantially aligned with the central axis OO' of the fixed shaft, so that the crankshaft simulation device is generally in the form of a straight shaft;
   in the working state of the crankshaft simulation device, the first end of the wedge-shaped rod is moved out of the flat through hole and is retracted into the through hole, and the movable shaft is shifted outwards in the radial direction of the movable shaft under the elastic force of the spring, resulting in the central axis of the movable shaft being deviated from the central axis OO' of the fixed shaft, so that the crankshaft simulation device is generally in the form of a crankshaft and the movable shaft is drivable by the fixed shaft to rotate eccentrically.

2. The crankshaft simulation device according to claim 1, wherein,
   a protrusion is provided on the end face of the first axial end of the fixed shaft, and a groove is provided on the end face of the movable shaft opposite to the first axial end of the fixed shaft, the groove is configured to extend in the shifting direction of the movable shaft, and the protrusion is embedded in the groove,
   the protrusion is slidable in the groove when the movable shaft is shifted in the radial direction of the movable shaft, and
   a circumferential force is applicable by the protrusion to the side wall of the groove when the fixed shaft is rotated around its central axis OO', thereby driving the movable shaft to rotate eccentrically.

3. The crankshaft simulation device according to claim 1, wherein,
   the support rod and the fixed shaft are integrally formed integral members; or
   the support rod is a separate component relative to the fixed shaft, the second end of the support rod is inserted and fastened into a hole of the first axial end of the fixed shaft.

4. The crankshaft simulation device according to claim 1, wherein,
   when the second end of the wedge-shaped rod is pulled by an external force, the wedge-shaped rod is moved away from the movable shaft in the axial direction of the fixed shaft, so that the first end of the wedge-shaped rod is moved out of the flat through hole and retracted into the through hole; and
   when the second end of the wedge-shaped rod is pushed by an external force, the wedge-shaped rod is moved towards the movable shaft in the axial direction of the fixed shaft, and the first end of the wedge-shaped rod is extended out of the through hole and gradually inserted into the flat through hole of the movable shaft, so that the movable shaft is returned to an unshifted state due to being pressed by the inclined surface of the first end of the wedge-shaped rod.

5. The crankshaft simulation device according to claim 1, wherein,
   a block is provided at the first end of the support rod to prevent the movable shaft from falling off the support rod.

6. The crankshaft simulation device according to claim 1, wherein,
   the diameters of two ends of the wedge-shaped rod are larger than the diameter of a middle section of the wedge-shaped rod, and the diameter of a middle section of the through hole is smaller than the diameter of the two ends of the wedge-shaped rod, so as to prevent the wedge-shaped rod from falling out of the through hole.

7. A detection equipment adapted to detect the eccentric movement trajectory of a moving component, comprising:
   the crankshaft simulation device according to claim 1; and
   a tooling on which tooling holes are provided, and a moving component to be detected is pre-arranged in the tooling,
   wherein, in non-working state of the crankshaft simulation device, the movable shaft and a part of the fixed shaft are insertable into the tooling holes, resulting in the movable shaft being inserted into the moving component to be detected, so that the moving component to be detected is driven by the movable shaft to perform eccentric movement in the working state of the crankshaft simulation device.

8. A method for detecting an eccentric movement trajectory of a moving component by using the detection equipment according to claim 7, comprising:

arranging the moving component to be detected in the tooling;

in non-working state of the crankshaft simulation device, inserting the movable shaft and a part of the fixed shaft into the tooling holes so that the movable shaft is inserted into the moving component to be detected;

pulling the second end of the wedge-shaped rod with an external force to move the wedge-shaped rod away from the movable shaft in the axial direction of the fixed shaft, and have the first end of the wedge-shaped rod moved out of the flat through hole and retracted into the through hole, the movable shaft is shifted outwards in the radial direction of the movable shaft under the elastic force of the spring, resulting in that the central axis of the movable shaft is deviated from the central axis of the fixed shaft, thereby causing the crankshaft simulation device to be switched into working state; and driving the fixed shaft to rotate around its central axis OO' with an external force, the movable shaft is driven by the fixed shaft to perform eccentric rotation, and the moving component to be detected is driven by the movable shaft to perform eccentric movement.

9. The method according to claim 8, further comprising:
pushing the second end of the wedge-shaped rod with an external force after the eccentric movement trajectory of the moving component has been detected to move the wedge-shaped rod towards the movable shaft in the axial direction of the fixed shaft, and have the first end of the wedge-shaped rod extended out of the through hole and gradually inserted into the flat through hole of the movable shaft, so that the movable shaft is returned to an unshifted state due to being pressed by the inclined surface of the first end of the wedge-shaped rod; and removing the crankshaft simulation device from the tooling holes.

10. The method according to claim 8, wherein,
the external force is applied by the hand of an operator of the detection equipment.

11. The crankshaft simulation device according to claim 2, wherein,
a block is provided at the first end of the support rod to prevent the movable shaft from falling off the support rod.

12. The crankshaft simulation device according to claim 3, wherein,
a block is provided at the first end of the support rod to prevent the movable shaft from falling off the support rod.

13. The crankshaft simulation device according to claim 4, wherein,
a block is provided at the first end of the support rod to prevent the movable shaft from falling off the support rod.

14. The crankshaft simulation device according to claim 2, wherein,
the diameters of two ends of the wedge-shaped rod are larger than the diameter of a middle section of the wedge-shaped rod, and the diameter of a middle section of the through hole is smaller than the diameter of the two ends of the wedge-shaped rod, so as to prevent the wedge-shaped rod from falling out of the through hole.

15. The crankshaft simulation device according to claim 3, wherein,
the diameters of two ends of the wedge-shaped rod are larger than the diameter of a middle section of the wedge-shaped rod, and the diameter of a middle section of the through hole is smaller than the diameter of the two ends of the wedge-shaped rod, so as to prevent the wedge-shaped rod from falling out of the through hole.

16. The crankshaft simulation device according to claim 4, wherein,
the diameters of two ends of the wedge-shaped rod are larger than the diameter of a middle section of the wedge-shaped rod, and the diameter of a middle section of the through hole is smaller than the diameter of the two ends of the wedge-shaped rod, so as to prevent the wedge-shaped rod from falling out of the through hole.

17. The method according to claim 9, wherein,
the external force is applied by the hand of an operator of the detection equipment.

* * * * *